United States Patent

[11] 3,530,779

| [72] | Inventor | John W. Alofs,<br>648 Ethel Ave. SE., Grand Rapids,<br>Michigan 49506 |
|---|---|---|
| [21] | Appl. No. | 598,349 |
| [22] | Filed | Dec. 1, 1966 |
| [45] | Patented | Sept. 29, 1970 |

[54] THREE-DIMENSIONAL PHOTOGRAPHY
11 Claims, 4 Drawing Figs.

[52] U.S. Cl. ..................................................... 95/18,
96/81, 95/36
[51] Int. Cl. .......................................................G03b 35/08
[50] Field of Search............................................ 95/18P,
36, 37; 88/24P; 96/81, 80, 18P

[56] References Cited
UNITED STATES PATENTS

| 2,274,531 | 9/1940 | Killick | 96/80 |
| 2,950,644 | 8/1960 | Land et al. | 95/18 |
| 3,388,027 | 8/1968 | Altman | 352/232 |
| 1,935,471 | 11/1933 | Kanolt | 95/18 |
| 1,991,888 | 2/1935 | Ernst | 96/81 |

*Primary Examiner*—Norton Ansher
*Assistant Examiner*—Richard M. Sheer
*Attorney*—Price, Heneveld, Huizenga and Cooper ABSTRACT: A photographic film construction in which a layer of photosensitive material is applied to a typical supportive backing sheet and a plurality of minute, generally transparent, mutually independent lens elements in the form of glass beads are secured to the photosensitive layer by being embedded therein. Also, a method of making three-dimensional photographic reproductions by exposing a photographic film construction of the aforesaid nature to an illuminated subject such that each of the glass bead lens elements focuses light reflected from an illuminated subject onto the photosensitive layer immediately behind that lens element to record an image thereon of the subject as seen by that particular lens element, all such images thereby collectively forming a three-dimensional reproduction of the subject.

Patented Sept. 29, 1970
3,530,779
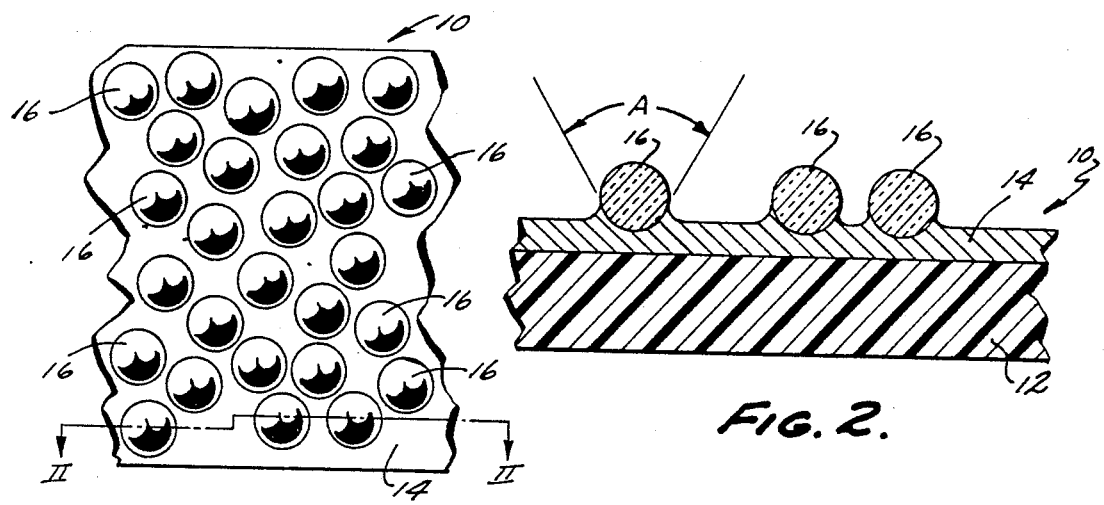
FIG. 1.
FIG. 2.
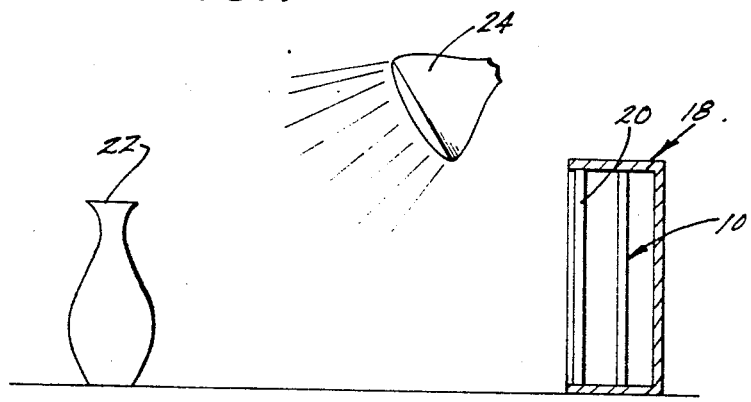
FIG. 3.
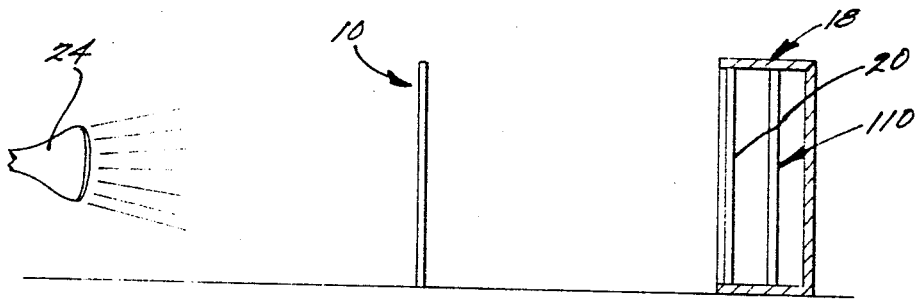
FIG. 4.
INVENTOR.
JOHN W. ALOFS
BY
ATTORNEYS

THREE-DIMENSIONAL PHOTOGRAPHY

BACKGROUND OF THE INVENTION

The present invention relates to the field of photography, and more particularly to the reproduction of three dimensional images through photographic techniques.

The idea of making three dimensional photographic reproductions was, generally speaking, conceived of long ago. Many different forms of this concept have since been produced with rather widely varying degrees of success. In large part, all such previous variations of this concept have utilized optical gratings, generally of high precision form, and some have also used precision lenses. Such gratings and lenses made the varying techniques extremely tedious and painstaking, and productive of a high incidence of difficulty and at least partial failure. So far as is known, such previous processes were practiced through the use at some stage of conventional cameras for focusing light reflected from the subject to be photographed upon the film to suitably expose the latter.

SUMMARY OF THE INVENTION

The present invention provides a new and unique form of photographic film by which three dimensional photographic reproductions may be obtained, as well as a method of making such film. The invention also provides a new method of taking three dimensional photographs through the use of the new type of film. This new type of film completely eliminates the need for a precision optical grating, or for any optical grating whatever, and it also eliminates the need for a camera, at least of the type which is conventionally thought of as being a camera. The new type of film is easy to handle and use, and is in effect an integrated construction. Nonetheless, the new type of film is developed through conventional techniques, and does not require any new equipment or materials. Additionally, the method of photography provided herein produces three dimensional images of remarkable clarity and depth, and which in their final stage of reproduction are of a true stereoscopic nature, as opposed to being pseudoscopic, or of reversed relief or curvature.

DESCRIPTION OF THE DRAWINGS

FIG. 1 is a greatly enlarged, fragmentary, overhead plan view of a portion of the film provided by the invention;

FIG. 2 is a further enlarged, fragmentary, sectional elevation taken through the plane II–II of FIG. 1;

FIG. 3 is a pictorial elevational view illustrating the use of the new film in making a three dimensional reproduction; and FIG. 4 is a pictorial view similar to FIG. 3 but showing the making of a positive or true stereoscopic print according to the method of the invention.

DESCRIPTION OF A PREFERRED STRUCTURAL EMBODIMENT

Referring now in more detail to FIGS. 1 and 2, the new film designated generally 10 is, from a purely structural point of view, not particularly complex and is readily understood. As in the case of conventional photographic film, the film construction of the invention includes a supportive bottom layer or backing sheet 12, preferably of a transparent plastic substance such as acetate, Mylar, or the like, upon which is placed a layer of photosensitive material 14 of a typical type, preferably a gelatin emulsion. The supportive backing sheet or bottom layer 12 is a somewhat resilient member but is relatively stiff and is rigid enough to support itself and the emulsion layer 14 horizontally when held at only one point on its edge; consequently, it is referred to herein as being "generally rigid" although it will be understood that this term does not in any sense connote inflexibility.

The outer surface of the photosensitive emulsion 14 carries a large number of tiny lens elements 16. These are attached to the emulsion by being embedded therein while the same is in a state of solubility, preferably a gel state. That is, the elements 16 may be applied to the emulsion after it has been applied to the backing sheet 12 but before it has set up firmly thereupon, or the emulsion may be wetted at some time subsequent to its initial application to the backing sheet through the use of an appropriate solvent, such as water in the case of a gelatin emulsion. Upon being wetted, the emulsion will enter a gel state, during which it will be receptive to the embedding of the lens elements 16 therein. After the emulsion has then hardened or set up once again, the lens elements will be firmly held in the emulsion.

The lens elements 16 are preferably of a nominally spherical shape, as illustrated; that is, they are as nearly spherical as commercial manufacturing tolerances normally produce. The lens elements are of a substantially transparent material such as glass, and they should have a high refractive index in the general range of 1.7 to 1.9. Glass beads of the indicated generally spherical shape are preferably used, and these should have a size in the nominal range of .001 to .010 inches in diameter; for the purposes of the present disclosure beads in this size range are considered to have substantially the same dimensions. Due to the preferred refractive index just noted, the beads will thus have a focal length which is roughly equal to their diameters. As will be understood from the dimensions just stated for the lens elements 16, FIGS. 1 and 2 are very greatly enlarged, with FIG. 1 actually representing a fragment of the film of but about one-tenth of one inch in width, inasmuch as several thousand of the lens elements will be present in each square inch of the film, spaced as closely as random occurrence permits.

It is desirable that, as illustrated in FIG. 2, the beads be embedded well into the emulsion and not merely contacting its outer surface, since the extent to which they are embedded determines the size of the emulsion area in contact with the beads and thus bears a direct relationship to the angular size of the conical stereoscopic field of view which the film construction will exhibit upon exposure and development, as noted subsequently. It is presently thought that the conical angle of embediment indicated at A in FIG. 2 should be at least on the order of 90° for suitable viewing effects. To embed the lens elements or beads 16 in the emulsion, the lens elements may be sprinkled onto the wet emulsion or applied thereto in any other desired depositing procedure, such as by placing the glass beads in a light jet of air under low pressure. Also, it may be possible to mix the lens elements into the emulsion material before it is applied, to thereby achieve much the same result.

PREFERRED EMBODIMENT OF THE METHOD OF USE

The manner in which the completed film construction 10 is used is illustrated in FIGS. 3 and 4. The film construction 10 is placed at the rear of a receptacle or enclosure 18 in the form of a box and resembling to some extent a shallow box camera, but without the usual lens arrangement at the front, and with only a shutter means 20 such as a curtain shutter at the front of the enclosure. A desired subject 22 whose image is to be recorded is placed directly in front of the shuttered end of the enclosure 18 and is suitably illuminated, either naturally, through the use of sunlight, or artifically, through the use of a desired lamp 24 or system thereof. The film construction 10 is then exposed to the illuminated subject 22 by operation of the curtain or other shutter means 20.

Upon exposure to the illuminated subject 22, each of the glass beads 16 upon which light reflected from the subject falls acts as a tiny spherical lens which is carried directly by the film, i.e., by the photosensitive emulsion 14. In this manner, each such lens element records on the portion of the emulsion adhering to its rearward surface a tiny image of the illuminated subject as seen from the position of that particular lens element. Beads or lens elements located at positions remote from one another on the emulsion will thus record relatively widely different views of the subject upon the emulsion. It is to be noted in this connection that it has been found that best results are achieved when the subject is of about the same size as the sheet of film and located a distance away from the film which is roughly equal to the largest film dimension when lens elements of the size and nature previously specified are used in the film construction.

The film exposed in the foregoing manner is developed according to conventional techniques dictated by the type of photosensitive emulsion being used. The result is a negative image of the subject which exhibits a strong and marked three-dimensional effect with exceptional depth. This three-dimensional image is, however, a "pseudoscopic" image, i.e., an inside-out steroscopic image of the subject. A positive, true steroscopic image is produced in the manner shown in FIG. 4. Here the film 10 bearing the pseudoscopic image is positioned with a light source 24 illuminating it from one side, and the enclosure 18 is set up as before on the side of the film 10 opposite that facing the lamp 24. In this case, the enclosure 18 carries a second sheet 110 of the film construction of the invention. An exposure is made as before by tripping the shutter means 20, and this time the image on the film 10 is transferred to the film 110 which, when developed, will then carry a true steroscopic image of the subject 22. For this reason, the backing sheet 12 of the film 10 should be substantially transparent, but this is not necessarily true of the backing sheet used in the film 110, which may be of conventional photographic paper if desired.

The true steroscopic image formed on the film 110 will be seen as though suspended in space with respect to the supportive backing sheet of this film. Depending on the distance of film 110 from film 10 when the former is exposed, the steroscopic image recorded on film 110 may appear to be well in front of the film, behind the film, or even appearing to extend from behind it well into space in front of it. When this film is viewed, the beads or lens elements on the film 110 act as tiny spherical projectors, each projecting the image recorded on the emulsion directly behind it in concert with the similar images from the other beads or lens elements, which together form a composite reproduction of the subject.

As will be apparent to those skilled in the pertinent arts, the present invention provides a film construction for a three-dimensional photographic reproduction which, in addition to the virtues of the steroscopic image produced, is exceedingly easy to produce, either on an experimental or a production basis, and is also extremely easy to handle and use, inasmuch as the critical aspects of precision lenses and precision optical gratings have been entirely eliminated. Also, the method of photography made possible by the present film construction dispenses with the typical camera used in photography, since the image-producing lens elements are carried directly on the film itself, and no lens is necessary in the shutter enclosure playing the part of the typical camera. Consequently, it will be apparent that a new method of photography has been provided of a type considerably different from others previously used.

It is entirely conceivable that upon examining the foregoing disclosure, those skilled in the art may devise embodiments of the concept involved which differ somewhat from the embodiment shown and described herein, or may make various changes in structural details to the present embodiment. For example, a sheet of lens material might be provided and a large number of individual spherically configured lens elements formed into the sheet, as by embossing. The emulsion could then be sprayed or otherwise applied directly to one side of the lens sheet and the backing sheet thus dispensed with, since the lens sheet would then provide a similar supportive structure. In this manner, a film construction very similar to that set forth hereinabove would be provided, in which the lens elements are in effect embedded in the emulsion and one such component part of the film carries the other. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:

1. A photographic film construction for recording a three-dimensional image, comprising: means providing a generally planar supportive structure; a layer of photosensitive material carried at least in part by said supportive structure; and lens means embedded in said layer of photosensitive material; said lens means including a plurality of mutually spaced lens elements each having a generally spheroidally shaped portion entering and embedding into said layer to form a correspondingly shaped concavity therein.

2. The photographic film construction recited in claim 1, wherein said supportive structure comprises a generally rigid backing sheet, and wherein a said lens means comprises a plurality of minute, generally transparent, mutually independent lens elements, each having generally spherically curved peripheral surface portions and each secured to said layer of photosensitive material by having at least a part of said spherically curved surface portions embedded therein.

3. The photographic film construction recited in claim 2, wherein at least some of said lens elements are generally spherical in overall shape.

4. The photographic film construction recited in claim 3, wherein substantially all of said lens elements are generally spherical in overall shape and of substantially the same dimensions.

5. The photographic film construction recited in claim 4, wherein said lens elements comprise glass beads of relatively high refractive index.

6. The photographic film construction recited in claim 5, wherein said beads have a diameter in the general range of .001 to .010 inches.

7. A method of manufacturing a photographic film which will record a three-dimensional image, comprising the steps of: providing a supportive backing sheet; applying a layer of photosensitive material to said backing sheet; and attaching a plurality of minute, mutually independent lens elements having spheroidally-shaped sections to said layer of photosensitive material by embedding a spheroidally-shaped section of the same at least partially thereinto to form correspondingly-shaped concavities in said material.

8. The method of manufacturing a photographic film defined in claim 7, wherein said attaching step is done with said layer in a state of at least partial solubility, and said lens elements are deposited upon said layer while the same is in said state.

9. The method of manufacturing a photographic film defined in claim 8, wherein said attaching step includes the application of a solvent to said layer to bring it into its said state of solubility.

10. A method of producing three-dimensional photographic reproductions, comprising the steps: providing a photographic film construction having a plurality of minute, mutually independent generally spheroidally-shaped lens elements embedded in the photosensitive material of such film so as to form correspondingly-shaped concavities therein; arranging the illumination of a subject whose image is to be reproduced; and using at least some of the said lens elements carried by said photosensitive material to focus light rays reflected from said subject onto the region of photosensitive material located directly behind such lens elements to thereby record an individual image on each such region, such individual images collectively forming a three-dimensional reproduction of the said subject.

11. The method of producing three-dimensional photographic reproductions recited in claim 10, further including the steps of producing a copy of said reproduction, such steps comprising: illuminating the exposed film on which the reproduction was made from one side, and exposing a second such film to the said illuminated film from the side of the latter which is opposite the illuminated side, to thereby record a reproduction of the illuminated film upon said second film.